United States Patent
Lim et al.

[11] Patent Number: 5,510,300
[45] Date of Patent: Apr. 23, 1996

[54] SEALING GLASS COMPOSITIONS USING CERAMIC COMPOSITE FILLER

[75] Inventors: Byung C. Lim, Kyungki; Yoo S. Hong, Seoul; Ki Y. Lee; Tae H. Park, both of Kyungki, all of Rep. of Korea

[73] Assignee: Samsung Corning Co., Ltd., Rep. of Korea

[21] Appl. No.: 496,546

[22] Filed: Jun. 29, 1995

Related U.S. Application Data

[63] Continuation of Ser. No. 167,377, Dec. 15, 1993, abandoned.

[30] Foreign Application Priority Data

Dec. 16, 1992 [KR] Rep. of Korea ............... 92-24483
Dec. 8, 1993 [KR] Rep. of Korea ............... 92-26921
Dec. 8, 1993 [KR] Rep. of Korea ............... 93-26922

[51] Int. Cl.$^6$ ............................................. C03C 8/24
[52] U.S. Cl. ................. 501/18; 501/15; 501/47; 501/75; 501/17
[58] Field of Search .................... 501/15, 17, 32, 501/22, 47, 48, 75, 76, 18

[56] References Cited

U.S. PATENT DOCUMENTS

| | | | |
|---|---|---|---|
| 3,963,505 | 6/1976 | Dumesnil et al. | 501/15 |
| 4,002,799 | 1/1977 | Dumesnil et al. | 501/15 X |
| 4,186,023 | 1/1980 | Dumesnil et al. | 501/15 |
| 4,589,899 | 5/1986 | Hudeck | 501/15 X |
| 4,621,064 | 11/1986 | Matsuura et al. | 501/15 |
| 4,774,208 | 9/1988 | Yamanaka et al. | 501/15 |
| 5,145,803 | 9/1992 | Daimer et al. | 501/15 |
| 5,281,561 | 1/1994 | Dumesnil et al. | 501/17 |
| 5,346,863 | 9/1994 | Hikata et al. | 501/17 |

*Primary Examiner*—Karl Group
*Attorney, Agent, or Firm*—Kenyon & Kenyon

[57] ABSTRACT

The present invention relates to low temperature sealing glass compositions using ceramic composite filler useful for sealing alumina ceramic package, in particular, to compositions for hermetic-sealing cap and base of alumina package which consists of a solid $PbO-B_2O_3$ glass powder and a filler selected from zinc zirconium silicate composite or magnesium aluminum zirconium silicate composite as a low thermal expansion ceramic composite. The used composite filler composes of zircon and willemite crystal phase or zircon and cordierite crystal phase uniformly mixed on the filler and has the low thermal expansion coefficient of $20°\sim40°\times 10^{-7}/°C$.

2 Claims, No Drawings

SEALING GLASS COMPOSITIONS USING CERAMIC COMPOSITE FILLER

This application is a continuation of application Ser. No. 08/167,377, filed on Dec. 15, 1993 now abandoned.

BACKGROUND OF THE INVENTION

The present invention relates to low temperature sealing glass compositions using ceramic composite filler useful for sealing alumina ceramic package, in particular, to compositions for hermetic-sealing cap and base of alumina package which consists of a solid $PbO-B_2O_3$ glass powder and a filler selected from zinc zirconium silicate composite or magnesium aluminum zirconium silicate composite as a low expansion ceramic composite.

Recently, semi-conductor is high-integrated because of large capacity, so IC chip capacity tends to be increased, but its size be decreased.

And, since the application field of alumina package has more severe ambient condition than that of the plastic package, the higher mechanical strength of the sealed package must be maintained in the small sealing area. Therefore, the sealing composition for the above field has to be satisfied with basic properties such as electrical properties, chemical durability and the like required for sealing of alumina package, and simultaneously to have high mechanical strength.

The known sealing glass compositions for sealing alumina ceramic packages consist of a vitreous $PbO-B_2O_3$ glass powder and one or two low thermal expansion ceramic fillers such as β-eucryptite, cordierite, willemite, zircon, and the like.

Since β-eucryptite, cordierite, and willemite have the thermal expansion coefficient below $20°×10^{-7}/°C.$, the sealing compositions using them as a single filler with a low temperature glass may have a suitable thermal expansion coefficient corresponding to alumina package and a suitable fluidity at the sealing temperature. However, a high sealing strength cannot be maintained due to low intrinsic mechanical strength of the filler and microcracks occurred by large difference in thermal expansion coefficient between the used filler and the vitreous glass powder. For example, in order to reduce the microcracks formed at the interface between the filler and the vitreous glass component, the particle size of filler must be small, but in this case, the fluidity of sealing composition is decreased and its acid durability is also decreased due to increased surface area. In order to solve these problems, there is an improved prior art in which the sealing glass composition of two filler system consists of one of above fillers and zircon or tin oxide solid solution. But, in this case, it is still required to improve the mechanical strength and acid durability for hermetic sealing of alumina package.

On the other hand, zircon has to be added in an excessive content to the sealing composition in comparison with willemite or cordierite due to its high thermal expansion coefficient($20°~40°×10^{-7}/°C.$) in order to correspond to the thermal expansion coefficient of alumina package. And zircon as disclosed on Japanese Patent Publication No. 4-28657 can not be synthesized densely without sintering additives such as $Fe_2O_3$, ZnO, or $MnO_2$. The above sintering additives are segregated in the grain boundary of the sintered zircon and cause to increase the thermal expansion coefficient and dielectric loss. And, in case willemite, a sintering product can be only by heat-treating over 24 hours at high temperature as U.S. Pat. No. 4,522,925. Finally, to obtain dense cordierite without sintering additives is very difficult because of its very narrow sintering temperature range.

As the result of the above, it is acutely required to easily synthesize a new filler having the thermal expansion coefficient in the range of $20°~40°×10^{-7}/°C.$ and simultaneously having high mechanical strength and chemical durability.

SUMMARY OF THE INVENTION

It is objective to provide low temperature sealing glass compositions using a ceramic composite of low expansibility such as zinc zirconium silicate composite(hereinafter, this is "ZZS composite") or magnesium aluminum zirconium silicate composite(hereinafter, this is "MAZS composite") as a filler, which is able to seal an alumina ceramic package within a short time below 450° C., and which has an excellent of electric of and chemical properties and in particular, has high sealing strength.

The present invention is directed to sealing glass compositions consisting of low temperature $PbO-B_2O_3$ glass powder and filler characterized by consisting of low temperature $PbO-B_2O_3$ glass powder of 60~75 wt % and ZZS composite or MAZS composite of 25~40 wt % as the filler.

The used composite fillers give to improve the chemical stability and the mechanical strength in comparison with using one or more mixture of each two components consisting of the above composites.

DETAILED DESCRIPTION OF THE INVENTION

According to the present invention, said ZZS composite used as filler is characterized by composing of zircon and willemite crystal phase synthesized by heat-treating the oxide powder mixture from ZnO of 15~60 wt %, $ZrO_2$ of 15~60 wt % and $SiO_2$ of 25~35 wt % at 1350°~1450° C. and having the thermal expansion coefficient of $20°~40°×10^{-7}/°C.$ as a low expansion ceramic composite.

And, the composite does not only include any reaction additive, but also has high mechanical strength owing to finely mixed microstructure.

If the contents of ZnO, $ZrO_2$ and $SiO_2$ used in the present invention are out of the above ranges even if any one component of them, non-reactant or the other crystal phase outside of zircon or willemite crystal phase is formed, so the sealing properties are wrong due to a low fluidity by crystalization of the used glass composition during sealing. In particular, if the content of ZnO is less than 10 wt %, it is difficult to singly use as a filler due to high thermal expansion coefficient, and if the content is more than 60 wt %, the mechanical strength is decreased. Inversely, if the content of $ZrO_2$ is less than 10 wt %, the mechanical strength is decreased, and if the content is more than 60 wt %, the thermal expansion coefficient is increased.

Also, said MAZS composite is characterized by composing of zircon and cordierite crystal phase synthesized by heat-treating the oxide powder mixture from MgO of 2~10 wt %, $Al_2O_3$ of 5~25 wt %, $ZrO_2$ of 30~60 wt % and $SiO_2$ of 30~45 wt % at 1350°~1450° C. and having the thermal expansion coefficient of $20°~40°×10^{-7}/°C.$ as a low expansion ceramic composite.

According to the present invention, this composite does not also include any reaction additive, and has high mechanical strength owing to microstructure.

As well as the case of ZZS composite, if the contents of MgO, $Al_2O_3$, $ZrO_2$ and $SiO_2$ used for synthesizing said MAZS composite are out of the above ranges even if any one component of them, non-reactant or the other crystal phase outside of zircon or cordierite crystal phase is formed, so the sealing properties are wrong due to a low fluidity by crystalization of the used glass composition. In particular, if the content of $SiO_2$ is less than 30 wt %, it is difficult to singly use as a filler due to high thermal expansion coefficient, and if the content is more than 45 wt %, the mechanical strength is decreased.

Inversely, if the content of $ZrO_2$ is less than 10 wt %, the mechanical strength is decreased, and if the content is more than 60 wt %, the thermal expansion coefficient is increased.

Said two composites used in the present invention can be prepared at a low temperature for a short time in comparison with respectively synthesizing zircon, willemite or cordierite.

On the other hand, the low temperature glass powder according to the present invention consists of PbO of 75~87 wt %, $B_2O_3$ of 6~15 wt %, ZnO of 0.5~12 wt %. $SiO_2$ of 0.5~3 wt % and $Al_2O_3$ of 0.5~3 wt %, and then the glass transfer temperature is between 290° C. and 310° C. Therefore, the glass is sufficiently fluidized during heat treatment at a low temperature and is able to hermetically seal at vitreous glass status. But, since the thermal expansion coefficient($110°$~$120°\times10^{-7}$/°C.) of the above glass is higher than that($65°$~$70°\times10^{-7}$/°C.) of alumina package, crack is easily appeared by stress occured during sealing with this glass only.

Therefore, in the present invention the low temperature ceramic filler, ZZS composite or MAZS composite of 25~40 wt %, is added in said glass powder to adjust the thermal expansion coefficient of sealing composition to that of alumina package. Then, if the used content of ZZS composite is less than 25 wt %, the thermal expansion coefficient of the sealing composition is not corresponded to that of alumina package and crack is easily ouccured after application on the package due to low mechanical strength, and if the content is more than 40 wt %, it is difficult to seal at a low temperature due to low flow property.

And, in case of using MAZS composite as filler, it is same with the case of ZZS composite.

As the above-described, the low temperature sealing glass composition prepared by the present invention can seal the alumina package for a short time at the temperature below 450° C. And the composition has excellent of electric property, chemical property such as acid resistance and the like and sealing strength to usefully use for sealing a semiconductor package for intergrated circuits.

The present invention will be illustrated as more detailed following examples, but it is not limited by the examples.

EXAMPLE 1

Preparation of low temperature glass powder

In order to prepare $PbO$-$B_2O_3$ glass powder, lead oxide, anhydrous boron oxide, zinc oxide, silica and alumina were mixed according to composition ratio of following Table 1.

The mixture was put in platinum cruible, and after uniformly melting by heat treatment for 1 hour at 1000° C. in electric furnace, the obtained melting glass was poured between two stainless rollers to form thin plate. After pulverizing by alumina ball-mill, the powder was screened by 250 mesh size stainless seive to use for preparing a sealing composition.

TABLE 1

| Composition | Content (wt %) |
| --- | --- |
| PbO | 84.0 |
| $B_2O_3$ | 12.0 |
| ZnO | 2.5 |
| $SiO_2$ | 1.0 |
| $Al_2O_3$ | 0.5 |

EXAMPLE 2

Preparation of ZZS composite

ZZS composites as a low expansion ceramic filler were prepared according to the compositions of following Table 2.

TABLE 2

| | | | | | (unit: wt %) |
| --- | --- | --- | --- | --- | --- |
| Composition Sample No. | ZZS1 | ZZS2 | ZZS3 | ZZS4 | ZZS5 |
| ZnO | 21.9 | 36.5 | 51.1 | 14.6 | 58.4 |
| $ZrO_2$ | 47.0 | 33.6 | 20.2 | 53.8 | 13.4 |
| $SiO_2$ | 31.1 | 29.9 | 28.7 | 31.6 | 28.2 |
| Thermal expansion coefficient ($\times10^{-7}$/°C.) | 38 | 26 | 30 | 25 | 21 |

ZZS composite was synthesized by heat treatment for 4 hours at 1400° C. in electric furnace after wet-mixing and drying zinc oxide, silica powder and zirconia. Crystal phase of the prepared ZZS composite was closely examined by the powder x-ray diffraction analysis method, and finely mixed microstructure was observed by scanning electron microscope. As the result, it was found that ZZS composite composes of zircon and willemite crystal phase uniformly distributed with the particle size below 5 μm each. But, non-reactant or other crystal phase was not found.

The prepared ZZS composite was pulverized by alumina ball-mill, and the powder was screened by 250 mesh size stainless sieve to use for preparing a sealing composition.

EXAMPLE 3

Preparation of MAZS composite

MAZS composites as a low expansion ceramic filler were prepared according to the compositions of following Table 3.

TABLE 3

| Composition Sample No. | MAZS1 | MAZS2 | MAZS3 | MAZS4 | MAZS5 | MAZS6 |
|---|---|---|---|---|---|---|
| MgO | 2.7 | 4.1 | 5.5 | 6.9 | 9.6 | 11.0 |
| $Al_2O_3$ | 6.9 | 10.4 | 13.9 | 17.4 | 24.3 | 27.8 |
| $ZrO_2$ | 53.8 | 47.1 | 40.3 | 33.6 | 20.2 | 13.4 |
| $SiO_2$ | 36.6 | 38.4 | 40.3 | 42.1 | 45.9 | 47.8 |
| Thermal expansion coefficient ($\times 10^{-7}$/°C.) | 38 | 35 | 31 | 28 | 22 | 20 |

MAZS composite was synthesized by heat treatment for 4 hours at 1400° C. in electric furnace after wet-mixing and drying magnesia, alumina, silica powder and zirconia. Crystal phase of the prepared MAZS composite was closely examined by the powder x-ray diffraction analysis method, and finely mixed microstructure was observed by scanning electron microscope. As the result, it was found that MAZS composite composes of zircon and cordierite crystal phase uniformly distributed with the particle size below 5 μm each. But, non-reactant or other crystal phase was not formed.

The prepared MAZS composite was pulverized by alumina ballmill, and the powder was screened by 250 mesh size stainless sieve to use for preparing a sealing composition.

EXAMPLE 4

Preparation of low temperature sealing glass composition

The low temperature glass powder of 65 wt % prepared in example 1 was mixed with ZZS composit or MAZS composite of 35 wt % respectively prepared in example 2 or 3. Sealing glass compositions were prepared as following Table 4.

On the other hand, vehicle was added in the prepared sealing glass composition to form paste having a suitable viscosity, and the paste was printed on the base of alumina package and its cap.

After heat treatment for 10 mins at 430° C., sealing was carried out by equipping lead frame and heat-treating for 10 mins at 430° C. The sealing properties for the applied package were examined by MIL-STD-883B:METHOD 1011.2:CONDITION C method, that is, examination after percussion repeated for fifteen times by heating and cooling between −65° C. and 150° C.

As the result shown in table 4, it was not found any defect from all of the tested samples. This means that the low temperature sealing glass composition using the low expansion ceramic composite according to the present invention as a filler is suitable to hermetically seal alumina package.

Also, in order to examine the effect of the low expansion ceramic composite filler, as comparative examples, the characteristics for following sealing glass compositions were examined; the sealing glass composition(Sample No. 6) consisting of low temperature glass powder of 65 wt %, zircon of 24 wt % and willemite of 11 wt %: the sealing glass composition(Sample No. 7) consisting of low temperature

TABLE 4

| Section | Glass powder (65 wt %) + ceramic filler (wt %) | Thermal expansion coefficient (1) | Dielectric constant Dielectric loss (2) | Chemical resistance | Bending strength (kg/cm²) | Resistance to thermal shock |
|---|---|---|---|---|---|---|
| Example 4-1 (Sample No. 1) | ZZS 1 (35) | 65.0 | 12.4 55 | 0.42 | 720 | 0/100 |
| Example 4-2 (Sample No. 2) | ZZS 2 (35) | 64.7 | 12.2 58 | 0.54 | 660 | 0/100 |
| Example 4-3 (Sample No. 3) | ZZS 3 (35) | 64.2 | 12.2 53 | 0.65 | 580 | 0/100 |
| Example 4-4 (Sample No. 4) | MAZS 1 (35) | 65.3 | 11.8 62 | 0.39 | 710 | 0/100 |
| Example 4-5 (Sample No. 5) | MAZS 3 (35) | 64.6 | 11.4 64 | 0.45 | 650 | 0/100 |
| Comparative Example 1 (Sample No. 6) | zircon (24) + willemite (11) | 66.4 | 12.4 160 | 0.75 | 630 | — |
| Comparative Example 2 (Sample No. 7) | zircon (24) + cordierite (14) | 65.2 | 11.5 130 | 0.61 | 570 | — |

(Note)
(1) Thermal expansion coefficient: 25~25° C., unit: $\times 10^{-7}$/°C.
(2) Dielectric loss: 1MHz, 25° C., unit: $\tan\delta$, $\times 10^{-7}$
(3) Chemical resistance: 10% $H_2SO_4$, 25° C., 10 min, unit: mg/cm²

As shown in Table 4, the low temperature sealing glass compositions embodied by the present invention have the thermal expansion coefficient being able to tightly seal alumina substrate for IC package at low temperature, and have suitable dielectric constant and chemical resistance.

glass powder of 65 wt %, zircon of 21 wt % and cordierite of 14 wt %.

Then, the used zircon, willemite and cordierite respectively used to be prepared according to the method of Japanese Patent Publication No. 4-28657.

As shown in Table 4, firstly, from example 4-1 (Sample No. 1) in comparison with comparative example 1(Sample No. 6) having similar composition to that, it is found that the thermal expansion coefficient as a main characteristic of the present invention, in case of example 4-1, shows the value of $1.4° \times 10^{-7}/°C$. lower than that in comparative example 1. The reason is that sintering additive used for sintering zircon in comparative example 1 makes a high thermal expansion coefficient for sintered zircon due to existing in the composition after sintering.

And it is found that the bending strength(630 $kg/cm^2$) in comparative example 1 shows the value of about 15% lower than that(720 $kg/cm^2$) in example 4-1 having similar composition to that. This result corresponds to general ceramic characteristic that the mechanical strength is increased during forming a composite.

And, in case of chemical resistance (10% $H_2SO_4$, 25° C., 10 mins), comparative example 1 (0.75 $mg/cm^2$) remarkably is low in comparison with example 4-1 (0.42 $mg/cm^2$). In case of tested result for nitric acid or hydrochloric acid, comparative example 1 is lower than example 4-1. Also, in case of the inductivity, comparative example 1 is similar to example 4-1 according to the present invention, but in case of dielectric loss, example 4-1 of 62 remarkably is excellent in comparison with comparative example 1.

Such result was caused by $Fe_2O_3$ added as sintering reagent for synthesizing zircon in comparative example 1.

On the other hand, as to MAZS compsite filler, example 4-5(Sample No. 5) was compared with comparative example 7 (Sample No. 7) having similar composition to that. The result is also similar to the case of using the above ZZS composite.

In case of bending strength, comparative example 2(570 $kg/cm^2$) is about 15% lower than example 4-5 (650 $kg/cm^2$). And in case of chemical resistance(10% $H_2SO_4$, 25° C., 10 mins), as shown in Table 4, comparative example 2(0.61 $mg/cm^2$) is downed in comparison with example 4-5 (0.45 $mg/cm^2$). In case of tested result for nitric acid or hydrochloric acid, comparative example remarkably is low in comparison with example 4-5. Also, in case of inductivity, comparative example 2 is similar to example 4-5, but in case of dielectric loss, example 4-5 of 64 remarkably is excellent in comparison with comparative example 2.

Such result was also caused by $Fe_2O_3$ added as sintering reagent for synthesizing zircon in comparative example 2.

As shown on the above, the low temperature sealing glass compositions in accordance with the present invention have a suitable properties for sealing alumina IC package, and have excellent mechanical or chemical reliability and electrical property, because of use of the low expansion ceramic composite as the filler.

What is claimed is:

1. A sealing glass composition having low temperature $PbO-B_2O_3$ glass powder and filler comprising
   (i) 60 to 75 wt % of low temperature $PbO-B_2O_3$ glass powder, and
   (ii) 25 to 40 wt % of filler, wherein said filler is zinc zirconium silicate composite comprising zircon and willemite crystal phase synthesized by heat-treating an oxide powder mixture of 15 to 60 wt % of ZnO, 15 to 60 wt % of $ZrO_2$, and 28 to 32 wt % of $SiO_2$, at 1350° to 1450° C.

2. A sealing glass composition having low temperature $PbO-B_2O_3$ glass powder and filler, comprising
   (i) 60 to 75 wt % of low temperature $PbO-B_2O_3$ glass powder, and
   (ii) 25 to 40 wt % of filler, wherein said filler is magnesium aluminum zirconium silicate composite comprising zircon and cordierite crystal phase synthesized by heat-treating an oxide powder mixture of 2 to 10 wt % MgO, 5 to 25 wt % $Al_2O_3$, 30 to 60 wt % $ZrO_2$, and 30 to 45 wt % $SiO_2$, at 1350° to 1450° C., and having the thermal expansion coefficient of 20° to $40° \times 10^{-7}/°C$.

\* \* \* \* \*